United States Patent Office 3,190,932
Patented June 22, 1965

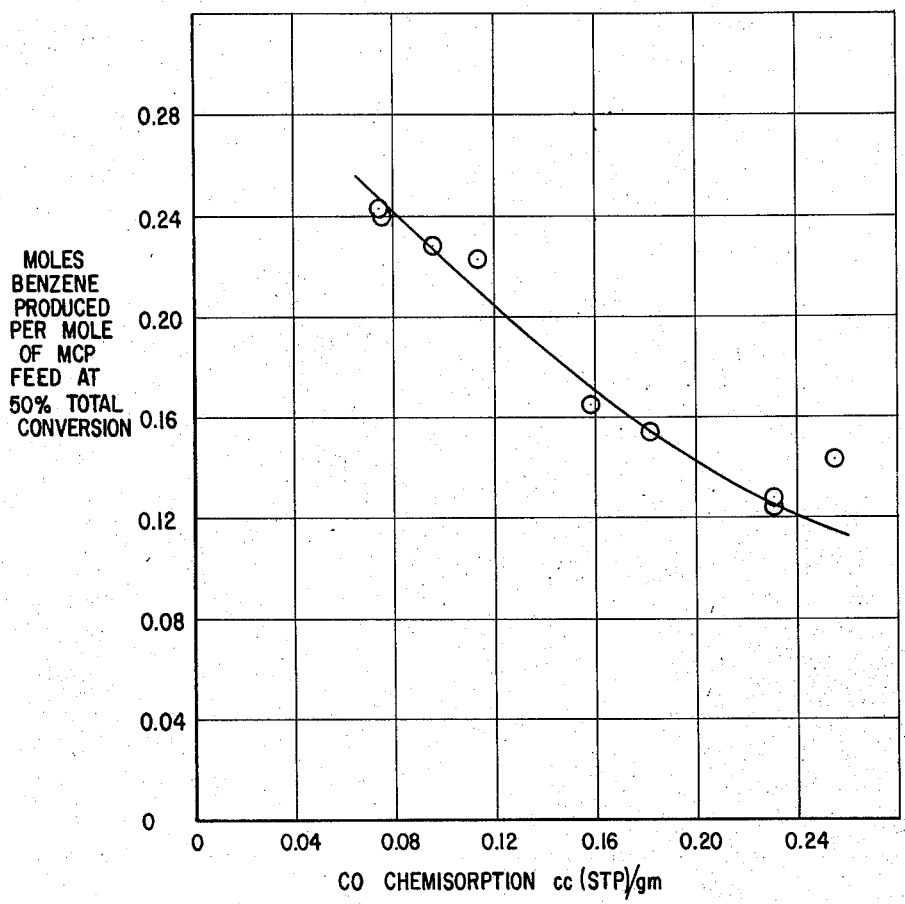

3,190,932
DEHYDROGENATION PROCESS AND CATALYST
Marvin F. L. Johnson, Homewood, Ill., assignor to Sinclair Research, Inc., Wilmington, Del., a corporation of Delaware
Filed Sept. 21, 1961, Ser. No. 139,761
4 Claims. (Cl. 260—668)

This invention is a method for the production of benzene from methylcyclopentane while minimizing side reactions. The method of the invention employs a catalyst which provides improved selectivity to benzene production. This catalyst, which is a coarse platinum metal-alumina catalyst, is distinct in its effects from catalysts containing highly dispersed platinum metal which generally cause undesirably high rates of conversion to hexanes and lighter paraffins of methylcyclopentane (MCP) alone or contained in mixed feedstocks. The catalyst used in this invention may be prepared from commercially available catalysts containing dispersed platinum or other platinum group noble metal.

The catalyst used in this invention is distinct from those reforming catalysts known to the art which contain platinum metal in a finely divided form, that is, as crystals undetectable by X-ray diffraction means. In such known catalysts the platinum-metal crystals are smaller than 50 Angstrom units in size and this fine dispersion of the platinum metal gives a catalyst having more activity in the reforming operation as a whole. The catalyst used in this invention, on the other hand, has platinum-metal crystals which usually can be detected by X-ray diffraction and therefore has a significant amount of its platinum in crystals of at least about 50 Angstroms.

The carbon monoxide chemisorption of a platinum catalyst varies with the size of the platinum crystals and may be used as a guide for catalyst selection and preparation. The known platinum-metal catalysts described above have the platinum metal so finely divided that the catalyst has a CO chemisorption greater than about 0.125 cc. per gram under standard conditions of temperature and pressure. The catalysts used in this invention, however, show a CO chemisorption of about 0.07 to 0.12 cc. (STP)/gm. CO chemisorption is measured after a careful reduction of the catalyst with pure hydrogen at 900° F., usually for 12 hours, and an evacuation at 570° F. and $10^{-5}$ mm. Hg, for 9 hours. Upon cooling to room temperature, a measured quantity of CO is admitted at 10–30 mm. pressure, and maintained for 1 hour. Unadsorbed CO and that which is weakly adsorbed is then removed by a gas pump. The CO chemisorption is then defined as the amount of carbon monoxide which is not removed by the gas pump, and is obtained by difference between CO admitted and CO recovered. In the absence of platinum-metal, the alumina will adsorb about 0.06 cc. (STP)/gm., a figure which should be regarded as a "blank" and which can be subtracted from the CO adsorption figure to obtain adsorption by platinum.

As can be seen in the accompanying drawing, which was prepared from the test results given below in Tables I and II, the amount of benzene produced from a given amount of MCP at a given level of conversion is inversely dependent on the CO chemisorption of the catalyst employed. The graph of the drawing compares the amount of benzene produced per mole of feed when a 50% conversion level is maintained. It clearly can be seen that platinum-metal on alumina catalysts having a CO chemisorption below about 0.12 give more than 20% conversion to benzene based on the feed or more than 40% conversion to benzene based on MCP disappearance.

Dispersed platinum metal-alumina catalysts generally comprise catalytically effective amounts of a platinum group metal supported on an alumina base. The catalyst generally contains about 0.01 to 2 weight percent, preferably about 0.2 to 1.0 weight percent, of one or more of the platinum metals of Group VIII, preferably the face-centered crystals, i.e., platinum, palladium, rhodium or iridium. The platinum group metal is deposited on an adsorptive alumina base of the activated or calcined type. The base is the major component of the catalyst. The catalyst base is essentially an activated or gamma-alumina such as those derived by calcination of amorphous hydrous alumina, alumina monohydrate, alumina trihydrate or their mixtures. The catalyst base precursor advantageously is a mixture containing, for instance, about 65 to 95 weight percent, of one or more of the alumina trihydrates bayerite I, nordstrandite (randomite or bayerite II) or gibbsite, and about 5 to 35 weight percent of alumina monohydrate (boehmite), amorphous hydrous alumina or their mixtures. The alumina base may contain small amounts of other solid oxides such as silica, magnesia, natural or activated clays (such as kaolinite, montmorillonite, halloysite, etc.), titania, zirconia, etc., or their mixtures. Although the components of the catalyst can vary as stated, a preferred alumina base has a surface area of about 150 to 550 square meters per gram.

A preferred catalyst base material is an activated or gamma-alumina made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms, gibbsite, bayerite I and nordstrandite as defined by X-ray diffraction analysis. The substantial balance of the hydrate is amorphous, hydrous or monohydrate alumina. Trihydrates are present as well defined crystallites, that is, they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in the patent, the calcined catalyst base can be characterized by large surface area ranging from about 350 to about 550 or more square meters/gram when in the virgin state as determined, for example, by the BET adsorption technique.

On the other hand, the low-area catalyst base prepared by treating a predominantly trihydrate base precursor as described in U.S. Patent No. 2,838,445, may be used. This base, when in the virgin state, has substantially no pores of radius less than about 10 Angstrom units and the surface area of the catalyst base is less than about 350 square meters/gram and most advantageously is in the range of about 150 to 300 square meters/gram.

The platinum group metal component of the catalyst can be added to the alumina base by known procedures. For instance, the platinum metal component can be deposited on a calcined or activated alumina, but it is preferred to add the platinum metal component to the alumina hydrate precursor. Thus platinum can be added through reaction of a halogen platinic acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications. Generally, the catalyst is shaped and formed before drying by extrusion, pelleting, etc., the desired shape being determined by the processing conditions under which the catalyst will be used. In this invention conversion of methylcyclopentane to benzene preferably takes place in a fixed bed of catalyst using catalyst particles of about $\frac{1}{16}$ to $\frac{1}{2}$ inch in diameter and $\frac{1}{16}$ to 1 inch in length.

The catalyst used in this invention may be made by coarsening the platinum or other platinum metal component of the catalysts just described. This can be done, for example, by treating the dispersed-platinum catalyst with one of a number of gases at an elevated temperature. Wet nitrogen or air may be passed over the catalyst at a temperature of about 1200 to 1400° F., or carbon monoxide at 800–900° F., until coarsening reaches the stage where CO chemisorption of the catalyst is in the desired 0.07 to 0.12 cc. (STP)/gm. range, preferably 0.07 to 0.11 cc. (STP)/gm. As pointed out, a CO chemisorption greater than this range is indicative that too much finely-divided platinum is present in the catalyst to give the required selectivity in conversion.

There are indications that such coarsening of the platinum may occur inadvertently in some commercial reforming systems due to long periods of operation under certain regeneration procedures. The resulting deactivated Pt-$Al_2O_3$ reforming catalyst may be employed in this invention, perhaps after gas treatment where insufficient coarsening has occurred.

The conversion of methylcyclopentane is carried out by passing a methylcyclopentane feedstock in contact with the catalyst at a temperature of about 800 to 1000° F., preferably about 850 to 950° F. in the presence of free or molecular hydrogen. A pressure of about 150 to 400 p.s.i.g., preferably 200 to 350 p.s.i.g. is maintained and the hydrogen is generally supplied in a molar ratio of about 0.01 to 30 moles hydrogen per mole of feed, or more preferably about 3 to 20 moles hydrogen per mole of hydrocarbon feed. Conveniently, the hydrogen concentration is maintained by recycling hydrogen-rich gases from the reaction zone. The WHSV is generally in the range of about 1–30, preferably about 2–15, the lower ranges of WHSV being made necessary by the relatively low activity level of the catalyst. The reaction, which is endothermic, preferably is performed in stages; that is, a plurality of reactors or reaction zones is provided for series contact of catalyst with the feed and heaters are usually provided between the individual reactors or zones to assure the proper reaction temperature. The hydrocarbon feedstock to the process of this invention comprises essentially methylcyclopentane, which may be employed alone or in a mixed feed such as a mineral oil naphtha fraction, for example, essentially a $C_6$ cut. Generally, however, the feed will consist of at least about 10% MCP, preferably at least about 20%.

EXAMPLES

A series of platinum-alumina catalysts were prepared and tested for conversion of MCP to benzene. The catalysts were prepared by the method described in U.S. Patent 2,838,444, as follows:

Pure aluminum metal is dissolved in pure hydrochloric acid, and the resulting solution is mixed with deionized water to form an aqueous aluminum chloride solution equivalent to approximately 65 grams of $Al_2O_3$ per liter. A separate deionized water solution of $NH_4OH$ is prepared containing approximately 65 grams of ammonia per liter. These two reagents, in the approximate volume ratio of 1:1 are intimately mixed as a flowing stream at a pH of 8.0. The flowing stream is passed to a stoneware container in which an alumina hydrate is precipitated. The precipitated hydrate is filtered from the mother liquid and washed to 0.2% chloride by successive filtrations and reslurryings in deionized water until the desired chloride concentration is reached. In each reslurrying, ammonia is added to give a pH of about 9. The washed hydrate is covered with water in a container and aged at about 90° F. until it is approximately 70% trihydrate, the remaining being substantially of the amorphous or monohydrate forms. The total hydrate composition is comprised of 42% bayerite, 18% randomite, 11% gibbsite, 20% boehmite, and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company infra-red moisture meter containing a 125 watt bulb, catalogue number 26675. The resulting mixture is forced through a die plate having holes $\frac{1}{16}''$ in diameter bolted to a $3\frac{1}{2}''$ Welding Engineers screw extruder. The resulting strands are broken to particles of length varying generally between about $\frac{1}{16}''$ and $1''$. The particles are dried at 230° F.

A sample of this extrudate containing 0.6% platinum was ground and sieved to 14–20 mesh. One portion was calcined by heating to 925° F. in a flow of nitrogen gas followed by flowing air at 900° F. to produce sample 112. This sample had an area of 487 square meters per gram, a CO chemisorption of 0.254 cc./gm. and no platinum could be detected by X-ray diffraction. Another portion of this sample was calcined in flowing wet hydrogen gas at 1100° F. to give sample 110, which had an area of 208 m.$^2$/gm., a CO chemisorption of 0.231 cc./gm. and showed no platinum under X-ray diffraction.

A further sample of extrudate made as mentioned above and containing 0.35% platinum also was ground and sieved and calcined as described above. The portion calcined in air, sample 111, had an area of 467 m.$^2$/gm. and a CO chemisorption of 0.181. The portion calcined in hydrogen, denominated sample 109, had an area of 193 m.$^2$/gm. and a CO chemisorption of 0.159. Neither of these samples showed platinum in X-ray diffraction.

A portion of sample 112 was treated with carbon monoxide at 875° F. for 3.5 hours to coarsen the platinum. This sample, 147, had about the same area as its parent catalyst, 497 m.$^2$/gm. but showed a CO chemisorption of 0.114 cc./gm. and showed 0.1% platinum under X-ray diffraction, which would be equivalent to platinum particles of about 50 A. in size. Similarly, sample 149 was prepared from a portion of 111 by the same treatment and showed the same area as its parent, a CO chemisorption of 0.090, and no platinum under X-ray diffraction. Samples of commercially available low area platinum catalysts, made as described above, were obtained. These samples, containing coarse platinum as the result of exposure to CO at elevated temperatures, were ground and sieved as above described to 14–20 mesh. One sample, 230, contained 0.6% platinum and had an area of 205 m.²/gm. and a CO chemisorption of 0.076. It showed 0.5% platinum under X-ray diffraction, indicating a platinum particles size of about 300 A. Sample 231 contained 0.35% platinum, had an area of 204 m.²/gm. and a CO chemisorption of 0.075. It showed 0.3% platinum under X-ray diffraction, indicative of a platinum particle size of 300 A. Sample 202 was prepared in the same manner as samples 147 and 149, except it contained 0.15% platinum and after grinding and sieving to 14–20 mesh, was recalcined with wet hydrogen gas at 1100° F. for 3 hours. It had an area of 173 m.²/gm. and a CO chemisorption of 0.096.

A five gram sample of each catalyst sample, diluted with 28–48 mesh tabular alumina, was charged in five equal sections (straight dilution) to a ½ inch sleeved stainless steel reactor. The reactor tube was pressure tested and put in a reactor system designed for isothermal operation. 2.5 cubic feet of hydrogen per hour were passed through the tube at 900° F. for 2 hours. After this reduction the entire system was pressured and depressured 3 times with hydrogen. A circulating pressure test was made on the unit. When the once-through hydrogen was set, processing was begun. Successive runs were made at various space velocities. This procedure was followed for all runs reported below. The hydrogen employed was cylinder hydrogen which was purified in a "Deoxo" unit and dried with activated alumina. Such treatment normally gives dew-points of −80 to −100° F.

The feed used in these runs was pure grade MCP from Phillips Petroleum Co. Previous analyses had indicated only trace quantities of n-hexane as impurities. The inspections of this methylcyclopentane feedstock are:

| | |
|---|---|
| Gravity, °API | 56.2 |
| Percent sulfur | 0.0005 |
| Percent nitrogen (total) | 0.000 |
| Percent nitrogen (basic) | 0.0000 |
| Refractive index at 20° C. | 1.4094 |
| RON | 92.5 |
| Purity, mol. percent | 99+ |

All runs were made at 350 p.s.i.g., 900° F., and 6 moles of hydrogen per mole of hydrocarbon on a once-through basis. Each run consisted of a 4-hour conditioning period followed by two 4-hour tests and then a 4-hour conditioning and a 4-hour test at the other WHSV conditions.

Gas samples were taken in each run and analyzed by mass spectrometer. Complete analyses of the 32° F. liquid products were made by gas chromatography. An electronic computer program was used to calculate yields of each component. The temperatures for each run were checked by three thermocouple readings recorded every hour during the test from the top, middle and bottom of the catalyst bed. The normal variation from the average is ±2° F., but occasionally is as high as ±4° F. The analyses of the liquid products were found to be very reproducible. The products from about 10–12 tests were resubmitted for analysis after several months storages in a deep freeze. In all but two cases the re-analyses checked the original analyses almost perfectly. Table I, below, shows the WHSV conditions required to give a 50% total conversion of the MCP and the C₆ yields obtained under these conditions. The remainder of the product mixture was mostly C₅-hydrocarbons and unreacted MCP.

Table I

| Run | Catalyst Sample No. | Percent Pt | CO Chemisorption | WHSV (gm./gm./hr.) | Products (mol/mol feed) Benzene | C₆ Paraffins | Cyclohexane |
|---|---|---|---|---|---|---|---|
| 1 | 110 | 0.6 | 0.231 | 49 | 0.13 | 0.33 | 0.01 |
| 2 | 110 | .0.6 | 0.231 | 53.5 | 0.13 | 0.33 | 0.01 |
| 3 | 109 | 0.35 | 0.159 | 36.5 | 0.17 | 0.30 | 0.01 |
| 4 | 112 | 0.6 | 0.254 | 43.5 | 0.14 | 0.33 | 0.01 |
| 5 | 111 | 0.35 | 0.181 | 32 | 0.155 | 0.32 | 0.01 |
| 6 | 147 | 0.6 | 0.114 | 26 | 0.22 | 0.25 | 0.02 |
| 7 | 149 | 0.35 | 0.090 | (19) | Insufficient Data | | |
| 8 | 230 | 0.6 | 0.076 | 22.5 | 0.24 | 0.22 | 0.02 |
| 9 | 231 | 0.35 | 0.075 | 26 | 0.24 | 0.22 | 0.02 |
| 10 | 202 | 0.15 | 0.096 | 10.5 | 0.23 | 0.23 | 0.02 |

Table II below gives the conversion and yield figures in moles/mole of feed obtained at 10 WHSV.

Table II

| Run | Total Conversion | Benzene | C₆ Paraffins | Cyclohexane |
|---|---|---|---|---|
| 1 | 0.92 | 0.209 | 0.618 | 0.007 |
| 2 | 0.93 | 0.177 | 0.662 | 0.007 |
| 3 | 0.90 | 0.226 | 0.595 | 0.007 |
| 4 | 0.96 | 0.200 | 0.622 | 0.007 |
| 5 | 0.86 | 0.200 | 0.570 | 0.007 |
| 6 | 0.75 | 0.370 | 0.357 | 0.015 |
| 7 | 0.63 | 0.285 | 0.306 | 0.016 |
| 8 | 0.69 | 0.346 | 0.303 | 0.018 |
| 9 | 0.74 | 0.367 | 0.319 | 0.017 |
| 10 | 0.50 | 0.236 | 0.231 | 0.018 |

It can clearly be seen from these results that the use of a platinum-on-alumina catalyst containing coarse platinum in all instances (runs 7 to 11) gave conversions of MCP to benzene greater than about ⅓ of the feed on the basis either of 50% total conversion, or of 10 WHSV, while catalysts containing dispersed platinum (runs 1–6) failed to give this great a conversion to benzene. These figures show that those catalysts which have higher CO chemisorptions are more active for total conversion of MCP but less selective for benzene formation.

It is claimed:

1. In a method for catalytic conversion of methylcyclopentane to benzene, the steps consisting essentially of passing methylcyclopentane and molecular hydrogen at a temperature of about 800 to 1000° F. and a pressure of about 150 to 400 p.s.i.g. in contact with a catalyst consisting essentially of a small catalytic amount of platinum group metal and activated alumina in which the platinum group metal exists as relatively coarse particles, and characterized by a CO chemisorption of about 0.07 to 0.12 cc. (STP) per gram of catalyst.

2. The method of claim 1 in which the catalyst particles are about 1/16 to ½ inch in diameter and 1/16 to 1 inch in length.

3. The method of claim 1 in which the amount of platinum group metal in the catalyst is about 0.01 to 2 weight percent.

4. In a method for catalytic conversion of methylcyclopentane to benzene, the steps consisting essentially of passing methylcyclopentane and molecular hydrogen supplied in a molar ratio of about 3 to 20 moles hydrogen per mole of methylcyclopentane at a temperature of about 850 to 950° F. and a pressure of about 200 to 350 p.s.i.g. in contact with a catalyst consisting essentially of about 0.2 to 1.0 weight percent platinum on activated alumina in which the platinum exists as relatively coarse particles, and characterized by a CO chemisorption of about 0.07 to 0.12 cc. (STP) per gram of catalyst.

References Cited by the Examiner

UNITED STATES PATENTS 2,871,277  1/59  Haensel _____ 260—668
2,972,644  2/61  Holmes et al. _____ 260—668

ALPHONSO D. SULLIVAN, *Primary Examiner.*